May 29, 1934. E. H. TOWLE 1,960,762
BRAKING MECHANISM FOR AIRSHIPS
Original Filed May 13, 1921

WITNESSES
Frederick Niehl.
R. H. Pattison.

INVENTOR
E. H. Towle
BY Munn & Co
ATTORNEYS

Patented May 29, 1934

1,960,762

UNITED STATES PATENT OFFICE 1,960,762

BRAKING MECHANISM FOR AIRSHIPS

Ellingwood H. Towle, Larchmont, N. Y., assignor to United States of America as represented by the Secretary of War Refiled for abandoned application Serial No. 469,209, May 13, 1921. This application February 19, 1932, Serial No. 594,338

4 Claims. (Cl. 244—2)

This application is a refile for abandoned application, Serial Number 469,209 filed May 13, 1921, and the invention relates to new and useful improvements in airships and the like, pertaining more particularly to a braking mechanism for the landing gear thereof. So far as is known the landing gears of airships have not been provided with braking mechanism adapted for operation during the landing of the airship for the reason that resistance offered to the traction wheels of the airship when in contact with the landing surface, causes a movement of the body of the ship about the axis of the wheels of the landing gear, which movement causes the ship to pitch fore and aft to a position which would result in engagement of the nose and its component parts with the landing surface and consequently the wrecking of the airship.

To so construct the landing gear of the airship that resistance may be applied to the traction wheels thereof without effecting an excessive fore and aft pitching of the ship, is one of the primary objects of the present invention.

It is a further object of the invention to provide means for manually controlling the resistance by the operator of the airship.

It is a further object of the invention to so position the wings or planes of the airship that when the fuselage thereof assumes a horizontal position owing to the resistance applied to the traction wheels of the landing gear or by depressing elevators, giving minimum drift or drag and hence shortest run in taking off, said wings or planes will have no lifting power and will therefore not serve to lift the wheels of the landing gear out of contact with the landing surface but will increase the force with which they are caused to engage the surface.

It is a still further object of the invention to provide a new and improved form of control mechanism for airships, the use of which permits the complete control of the machine when not in flight or when traveling on the ground, such as "taxiing" about.

With the above and other objects in view, reference is had to the accompanying drawing, in which—

Figure 1:
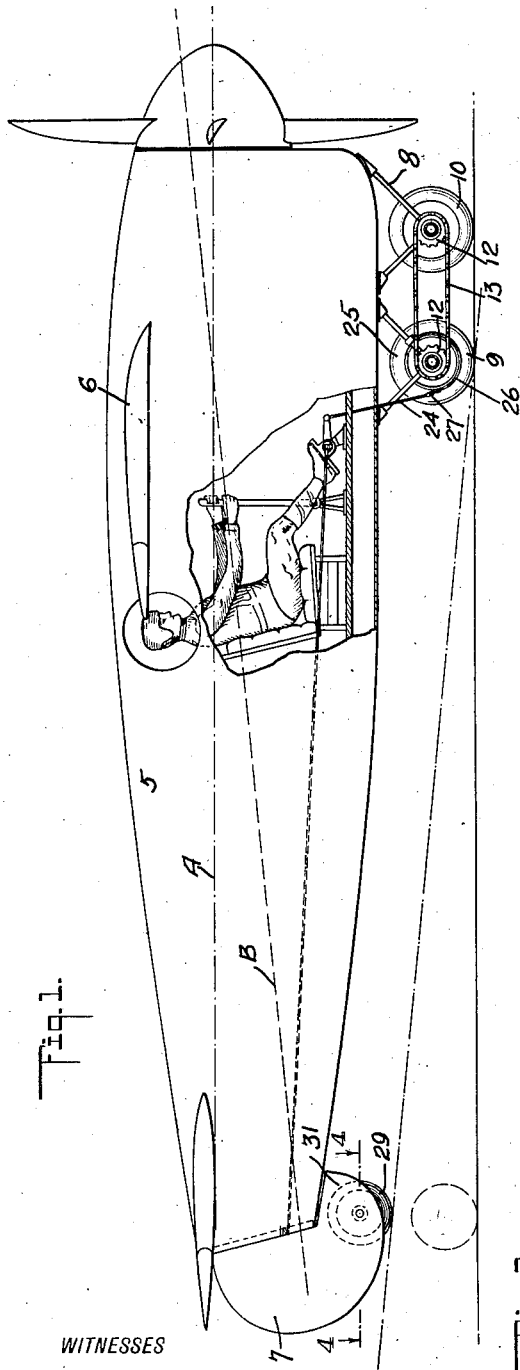
Figure 1 is a side elevation partly broken away of an airship constructed in accordance with the present invention.

Referring more particularly to the drawing, the reference character 5 designates the fuselage of the airship, and 6 designates the wings or planes thereof, the airship in the present instance being of the monoplane type. Pivotally carried by the rear of the fuselage 5 in the ordinary manner is a rudder 7, and secured to the fuselage beneath the forward end thereof, is a landing gear 8. This landing gear may be of any preferred type and differs from the present landing gear in that instead of using two wheels disposed on opposite sides of the fuselage, as is the common practice, the present invention contemplates the use of four wheels arranged in a rearward set of main landing wheels 9 and a forward set of auxiliary landing wheels 10, there being two wheels 9 and two wheels 10 arranged on opposite sides of the fuselage 5. Each of these wheels 9 and 10 is provided with a sprocket 12, and passing around said sprockets 12, is a chain 13, by means of which the wheels will be constantly driven in unison when in engagement with the landing surface.

The reference character 15 designates the rudder bar, pivotally mounted by means of a pin or the like 16 upon a base or standard rigidly secured in any desired manner to the floor of the airship. Pivotally secured to the ends of the rudder bar 15, as at 18, and extending rearwardly to the rudder, are the rudder control cables 19, said cables being connected to the rudder in such a manner that it may be moved to steer the ship when in flight.

Mounted upon the rudder bar 15, upon opposite sides of its pivotal point, are sleeves 20, and said sleeves are each provided with a foot pedal 21. These sleeves are loosely mounted on the rudder bar 15 and are free to rotate thereabout under the control of the operator of the ship. Each of these sleeves 20 is provided with a rigid arm 22, and pivotally connected to each of the arms 22, as at 23, is a rod or the like 24. Each of the rear wheels 9 of the landing gear is provided with a brake drum 25, and passing around said brake drum and adapted to be moved into contact therewith, is a brake band 26. The rods 24 heretofore mentioned are pivotally connected as at 27, to the brake band 26. By this construction it is apparent that as the sleeves 20 are rocked about the rudder bar 15, by the foot pedals 21, the brake bands 26 will be frictionally engaged with their respective brake drums 25 and a braking pressure will be applied to the rear wheels 9 of the landing gear.

From the above it will be seen that the rudder bar 15 is free to be moved about its pivotal point 17 in a horizontal plane to actuate the rudder control cables 19 without effecting an operation of the brakes, and that the brakes may be operated without effecting a movement of the rudder since as heretofore stated the sleeves 20 are freely rotatable about the rudder bar 15.

Figure 4:
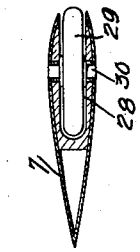
Figure 4 is a horizontal sectional view taken on the line 4—4 of Figure 1.
Figure 3:
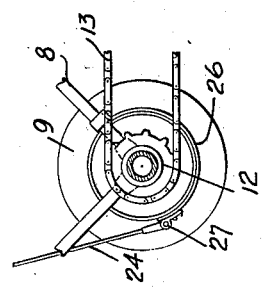
Figure 3 is a detail view in elevation of one of the braking wheels.
Figure 2:
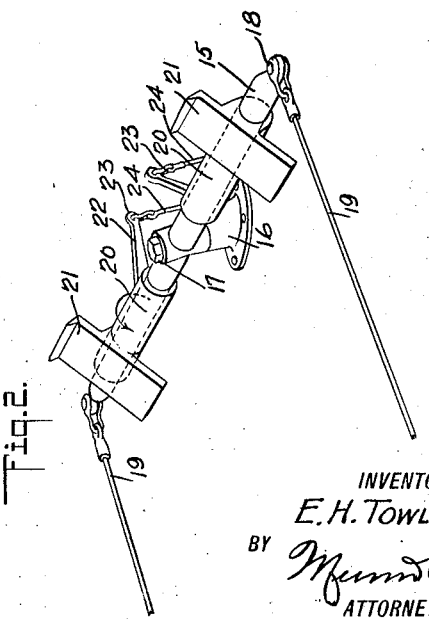
Figure 2 is a detail perspective view of the combined brake and rudder actuating mechanism.

The rudder 7 is shown in section in Figure 4, and said rudder is provided in its forward portion with a recess or housing 28. Rotatably mounted in this recess or housing 28, is a steering wheel 29, said wheel being mounted as at 30, in the rudder 7. As more clearly shown in Figure 1, this recess or housing 28 is formed in a portion 31 of the rudder, which projects forwardly thereof, and occupies a position beneath the rear end of the fuselage 5. By this construction it is apparent that when the steering wheel 29 is in engagement with the ground, a movement of the rudder will angularly position the steering wheel 29 with respect to the longitudinal axis or motor center of the ship and cause a lateral movemnet of the rear end of the shi , thus providing a steering means when the ship is traveling upon the ground.

The device operates in the following manner:
The reference character A designates the motor center of the ship, when the ship is in the position shown in Figure 1, and the reference character B designates the angular position of the motor center of the ship when the ship is in the position at which the best landing may be effected, i. e., with the rear wheels 9 of the landing gear and the steering wheel 29 simultaneously contacting with the surface on which the landing is to be made. Assuming now in making a landing that the machine alights with the rear wheels 9 of the landing gear and the steering wheel 29 in contact with the surface, the motor center will be in the position indicated by the line designated by the reference character B. As the ship alights, the operator pushes "stick" forward making ship horizontal and applies one or both brakes, whereupon resistance is immediately offered to the rear wheels 9 of the landing gear. Immediately this resistance takes effect owing to the momentum of the ship, the ship rocks about the axis of the rear wheels 9 of the landing gear and attempts to nose over. When the fuselage of the ship is rocked to a position where the airplane has an angle of attack at which the lift coefficient is zero, as when the motor center is in a plane indicated by the line designated by the reference character A, the front wheels 10 of the landing gear engage the surface and prevent further rocking of the machine about the axis of the rear wheels 9 of the landing gear.

It will be noted that when the ship assumes this position, which is shown in Figure 1, the planes or wings 6 thereof have an angle of attack which is zero or negative, and in which position the wings or planes have negative lifting power and therefore the wheels of the landing gear, through the medium of the weight of the ship and through action of air on upper side of wings, are maintained in contact with the landing surface.

Owing to the chain connection between the rear wheels 9 and the forward wheels 10 of the landing gear, the braking resistance on the rear wheels 9 of the landing gear is transmitted to the front wheels 10 thereof, and by proper manipulation of the brakes, it is apparent that the machine may be brought to rest at practically any desired point after the wheels of the landing gear have engaged with the landing surface. As the machine comes to rest, it is obvious that inasmuch as it is the common practice to position the center of gravity of the ship to the rear of the landing gear, the ship will settle and the wheel 29 carried by the rudder 7 will contact with the landing surface, after which the ship is free to be steered about the landing field at the will of the operator.

From the foregoing it is apparent that the present invention provides means for braking an airship when landing, and, at the same time, provides means for effectively steering the airship horizontally when "taxiing" or not in flight. Also the airship may be landed at speeds above minimum flying speed.

Having thus described my invention what I claim is—

1. In an airship, a landing gear, said landing gear comprising a plurality of wheels arranged at the front of the machine on opposite sides thereof in pairs, a brake for operating on the rear wheel of each of said pairs, a sprocket carried by each of said wheels, and a chain passing around said sprockets whereby the braking action applied to the rear wheel of each pair is transmitted to the front wheel of each pair, substantially as described.

2. An airplane having, in combination, a fuselage, a main landing wheel depending from the fuselage adjacent the forward end thereof, an auxiliary landing wheel depending from the fuselage forwardly of the main landing wheel, a driving connection between the said main and auxiliary wheels, and braking means for the said main landing wheel.

3. An airplane having, in combination, a fuselage, landing wheels depending from the fuselage adjacent the forward end thereof, and arranged in tandem, means for applying a braking pressure to the rear wheel, and a connection between the wheels causing the braking pressure applied to the rear wheel to be applied also to the front wheel.

4. An aircraft having a main landing wheel positioned forwardly of the center of gravity of the craft, means under the control of the pilot of the craft for applying a braking resistance to said main landing wheel, an auxiliary landing wheel depending from the craft forwardly of the main landing wheel and positioned to contact with the ground only when the craft assumes a negative angle of lift relative to the ground, as during a "nosing over" movement of the craft incident to the application, of a braking action to the main landing wheels, and a driving connection between the main and auxiliary landing wheels for transmitting to the latter the braking resistance applied to the former.

ELLINGWOOD H. TOWLE.